United States Patent
Seo et al.

(10) Patent No.: US 9,565,340 B2
(45) Date of Patent: Feb. 7, 2017

(54) AUTOMATIC FOCUSING BY MIRROR TRANSLATION

(75) Inventors: Cheong Soo Seo, Seongnam (KR); Gyoung Il Cho, Seoul (KR)

(73) Assignees: Angstrom, Inc., Seongnam (KR); Stereo Display, Inc., Anaheim, CA (US)

( * ) Notice: Subject to any disclaimer, the term of this patent is extended or adjusted under 35 U.S.C. 154(b) by 0 days.

(21) Appl. No.: 11/218,814

(22) Filed: Sep. 2, 2005

(65) Prior Publication Data

US 2007/0053673 A1 Mar. 8, 2007

(51) Int. Cl.
*G03B 13/36* (2006.01)
*H04N 3/08* (2006.01)

(52) U.S. Cl.
CPC ........................................ *H04N 3/08* (2013.01)

(58) Field of Classification Search
USPC .................... 396/89, 111; 348/345
See application file for complete search history.

(56) References Cited

U.S. PATENT DOCUMENTS

| | | | |
|---|---|---|---|
| 6,801,260 B1 * | 10/2004 | Veksland et al. | 348/345 |
| 6,934,072 B1 | 8/2005 | Kim | |
| 7,173,653 B2 * | 2/2007 | Gim et al. | 348/208.7 |
| 2006/0018651 A1 * | 1/2006 | Cho et al. | 396/111 |

OTHER PUBLICATIONS

Boyd et al., "Fast-response Variable Focusing Micromirror Array Lens", 2003, SPIE, vol. 5055, pp. 278-286.*
Pending, U.S. Appl. No. 10/872,241, Cheong Soo Seo.
Pending, U.S. Appl. No. 10/896,146, Gyoung Il Cho.

* cited by examiner

*Primary Examiner* — W. B. Perkey

(57) ABSTRACT

Automatic focusing system is provided which comprises a mirror or a plurality of mirrors with a translation device. Automatic focusing can be made by the translation of mirror because focal plane can be changed by the translation of mirror. The translation device makes its motion by the electrostatic, electromagnetic and/or electrothermal forces. The mirror is controlled by the electrical signal from the image processor to get an in-focus image. Also the mirror can be controlled discretely. The image shift by translation is compensated by tilt of mirror and/or image processing.

17 Claims, 5 Drawing Sheets

AUTOMATIC FOCUSING BY MIRROR TRANSLATION

BACKGROUND OF THE INVENTION

As the technology of imaging devices progresses, many devices such as cameras, camcorders, and other alternatives use automatic focusing system to capture fine quality of the images easily. The automatic focusing is performed by a serial processes as taking an image, processing the image, finding the focus, changing the focus, and feedback of the whole system.

Conventional automatic focusing lens system comprises a series of lenses, lens moving mechanisms, image sensors, image processors, and feedback system of the systems. When the image device and/or the imaged object is moved abruptly, the imaging device loses focus of an image and finds a new focus for the image. Since conventional automatic focusing systems use mechanical movement of a lens, they require a motor, which causes a large volume of the system. Also their feedback process is slow and needs lots of power consumption for a mechanical movement of a lens. Therefore, the imaging device obtains a blurred image while the auto focusing process is being performed.

Most conventional system performs its auto focusing function by introducing an electro-magnetically driven motor and/or piezo-electrically actuated apparatus to move one or more lenses. Since the movements of a lens or lenses need a macroscopic mechanical motion, the system needs a large volume and has a considerable inertia of the system. In consequence, the response speed of conventional automatic focusing system becomes slow to have real-time automatic focused images.

For the electromagnetic motor, the response speed is limited by the magnetic inductance. Imaging devices with fast automatic focusing have not appeared yet.

Thus there is a practical need for an improved automatic focusing system that enables clear images to be captured within an instance of time. Such system must be easy to manufacture and adapted for use with existing imaging devices.

SUMMARY OF THE INVENTION

The purpose of the present invention is oriented at a high-speed auto focusing system comprising a mirror translation device and at reducing the bulky volume of the conventional system. The auto focusing system has a capability of capturing clear images of fast moving objects and/or capturing clear images while an imaging device is moving and/or vibrating. Auto focusing system of the present invention comprises a flat mirror, or a set of small mirrors, or a micromirror array lens, or a mirror with a curvature combined with a micro electro-mechanical translation device.

An active auto focusing is accomplished by mirror translation performed by micro electro-mechanical device. Since the micro electro-mechanical device has a fast response time much faster than the reaction time of the human eyes, the whole auto focusing process is achieved instantaneously.

Just like a system described in FIG. 1, a mirror 13 is mounted on a translational device 12 to have a movement front and back. The translation makes a small focusing difference while the image sensor 15 captures the images. The image sensor 15 converts the photo energy of the light to an electrical signal carrying image data to the image processor 17A. The image processor 17A uses an algorithm 17B to compare the image quality of the image data with its focus criteria and generates a feedback signal. The feedback controls activates the translation device 12 to position the mirror 13. The translation device 12 and the mirror 13 can be made by microfabrication technologies and as a micro-electro mechanical device. Since the movement of the mirror fabricated by microfabrication technologies is fast, the settling time of finding the focus is short enough for human eyes not to feel the out of focus image.

The translation device in the system uses electrostatic force for making mirror translational motion. Since the electrostatics force uses little power consumption, the whole system barely consumes power. Also, the translation device in the system uses electromagnetic force for making movements of mirror. Electrothermal force can also be used for the system to make a translational motion. Any combinations of electrostatic, electromagnetic, and electrothermal forces can be used for making translational motion in the system. Piezo electric materials are available for making a translation device and also combined with electrostatic, electromagnetic, and/or electrothermal forces.

The same process can be applied to a set of mirrors with a translational device. Geometry with a set of small mirrors has an advantage of small mirror mass. Thanks to the small mass, the response time can be reduced by the factor of the mass of the small mirror divided by the mass of a large mirror.

Recently, a micromirror array lens using micro-electro-mechanical system technology is introduced, which is described in the U.S. patent application Ser. No. 10/806,299 for "High Speed Automatic Focusing System" filed on Mar. 23, 2004. Micromirror array lens can be applied to auto focusing by the translation device. Micromirror array lens moved by translational device changes the position of the micromirror array lens and gives the performance of the auto focusing function.

Another embodiment can be obtained by using a curved mirror. A curved mirror itself makes a focus but cannot have the variable focus and automatic focus function. By moving a mirror with a curvature, an auto focusing function can be achieved.

All the mirrors can be controlled discretely to obtain translation for getting auto focus function. Discretely controlled mirror system is described in detail in the U.S. patent application Ser. No. 10/872,241 for "Discretely Controlled Micromirror with multi-level positions" filed on Jun. 18, 2004. Single flat mirror, curved mirror, a group of small mirrors or micromirror array lens with translation can be discretely controlled their position by variable supporter discretely controlled micromirror (VSDCM), or segmented electrode discretely controlled micromirror (SEDCM) mechanisms. The discrete motion is achieved by electrostatic force controlled by digital and/or discrete operation of a voltage. And, the applied voltage to segmented electrodes can be digital and/or discrete voltage.

The present invention of the automatic focusing by mirror translation system has the following advantages compared with the prior arts: (1) the auto focusing by mirror translation system has a clear image capture in real-time; (2) the system is compact; (3) power consumption is small; (4) the system is cost effective and easy to fabricate.

Although the present invention is brief summarized herein, the full understanding of the invention can be obtained by the following drawings, detailed description, and appended claims.

3

DESCRIPTION OF THE FIGURES

These and other features, aspects, and advantages of the present invention will become better understood with reference to the accompanying drawings, wherein.

DETAILED DESCRIPTION OF THE INVENTION

Figure 1:
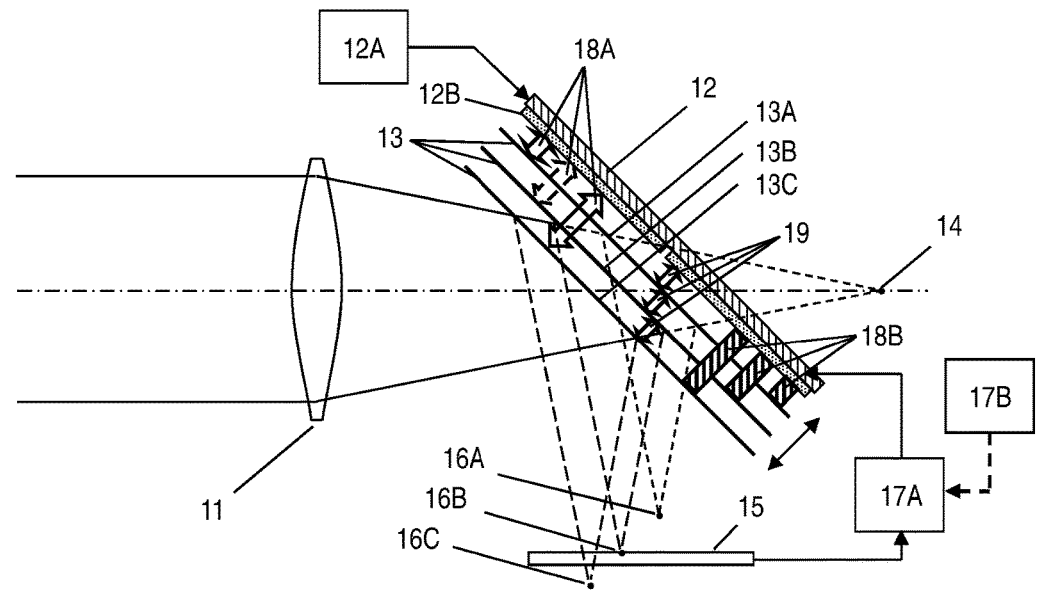
FIG. 1 is a schematic diagram showing auto focusing function by translation of flat mirror.

FIG. 1 shows a schematic diagram of the auto focusing device by mirror translation of the present invention. Without the mirror 13 for auto focusing, lens 11 makes its focus at a focal point 14. At this point, a mirror 13 with translation device 12 is introduced for having an auto focusing function for the optical system. The mirror 13 has a displacement between some ranges, for example, mirror position 13A or mirror positions 13B, 13C. At positions 13A and 13C, the foci 16A and 16C do not exist on the image sensor plane 15. If the mirror 13 moves to the position 13B, the mirror 13 and the optical system make a focus 16B exactly on the image sensor plane 15. The mirror 13 is not necessarily aligned with 45 degree to the center line. The angle between the mirror 13 and the center line can be varied if the geometry permits.

The mirror 13 obtains its translational motion by electrostatic, electromagnetic, and/or electrothermal forces 18A. Piezo electric materials 18B are also used for making translational motion and used with electrostatic, electromagnetic, and/or electrothermal forces 18A. The discrete motion 19 is achieved by electrostatic force 18A controlled by digital and/or discrete operation of a voltage 12A. And, the applied voltage 12A to segmented electrodes 12B can be digital and/or discrete voltage. The image sensor 15 converts the photo energy of the light to an electrical signal carrying image data to the image processor 17A. The image processor 17A uses an algorithm 17B to compare the image quality of the image data with its focus criteria and generates a feedback signal. The feedback control activates the translation device 12 to position the mirror 13.

Figure 2:
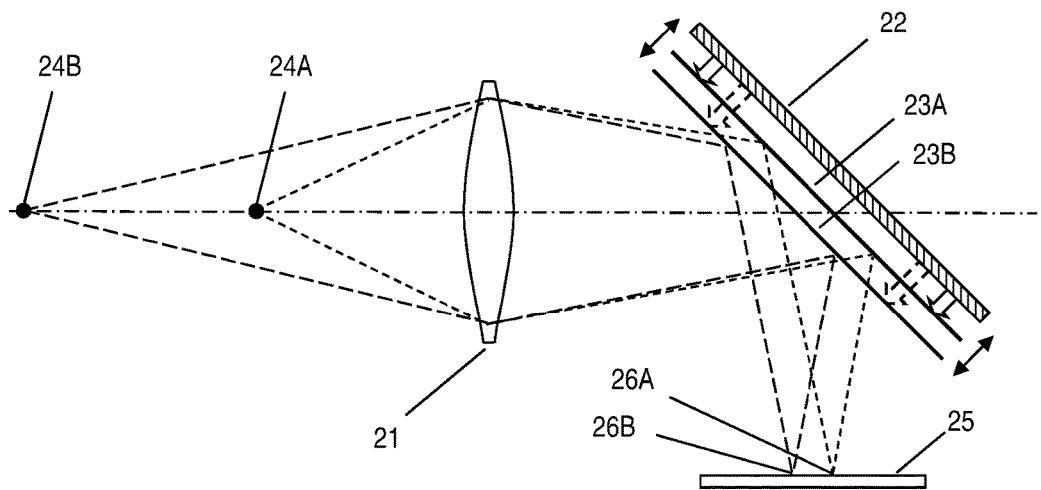
FIG. 2 is a schematic diagram for auto focusing function while the object distance is changed.

FIG. 2 shows a schematic diagram for auto focusing function while the object distance is changed. When the object moves its position from on point 24A to another 24B, the translation device 22 changes the mirror position from 23A to 23B and makes the focus 26B on the same image sensor plane 25. Even though the focusing lens 21 does not change its focal length, the system can make its focus on the image sensor plane 25.

Figure 3:
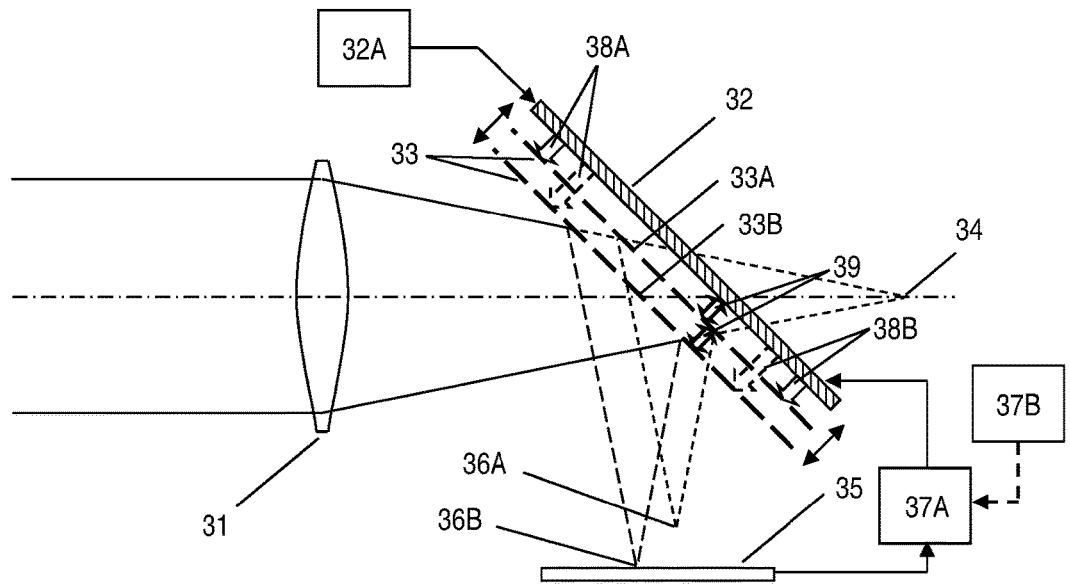
FIG. 3 is a schematic diagram showing auto focusing function by translation of a plurality of small sized flat mirrors.

FIG. 3 shows a schematic diagram showing auto focusing function by translation of a plurality of small sized flat mirrors. Without mirrors 33 for auto focusing, lens 31 makes its focus at a focal point 34. At this point, mirrors 33 and translation device 32 are added into the optical system to have an auto focusing function. The mirrors 33 have displacements from their bottom to some point high upon the mirror bottom, for example, position 33A of the mirrors 33 or position 33B of the mirrors 33. At position 33A, the focusing device makes a focus 36 out of the image sensor plane 35. If the mirror 33 moves to the position 33B, the mirrors 33 and the optical system make a focus 36 exactly on the image sensor plane 35.

The mirrors 33 obtain its translational motion by electrostatic, electromagnetic, and/or electrothermal forces 38A. Piezo electric materials 38B are also used for making translational motion and used with electrostatic, electromagnetic, and/or electrothermal forces 38A. The discrete motion 39 is achieved by electrostatic force 38A controlled by digital and/or discrete operation of a voltage 32A. And, the applied voltage 32A to segmented electrodes (not shown) can be digital and/or discrete voltage. The image sensor 35 converts the photo energy of the light to an electrical signal carrying image data to the image processor 37A. The image processor 37A uses an algorithm 37B to compare the image quality of the image data with its focus criteria and generates a feedback signal. The feedback control activates the translation device 32 to position the mirrors 33.

Figure 4:
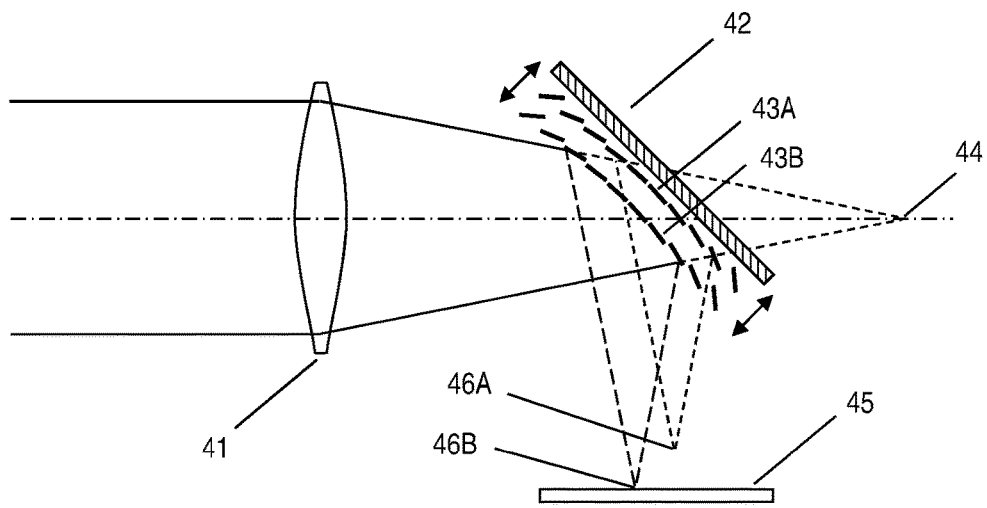
FIG. 4 is a schematic diagram showing auto focusing function by translation of micromirror array lens.

An automatic focusing system with translation of a micromirror array lens is shown in FIG. 4. Without mirror for auto focusing, lens 41 makes its focus at a focal point 44. For making an automatic focusing, a micromirror array lens 43 with a translation device 42 is introduced into the system. At position 43A, the lens 41 and the micromirror array lens 43 make a focus 46A out of the image sensor plane 45. If the micromirror array lens moves to the position 43B by translation of the micromirror array lens, the optical system makes a focus 46B exactly onto the image sensor plane 45.

Figure 5:
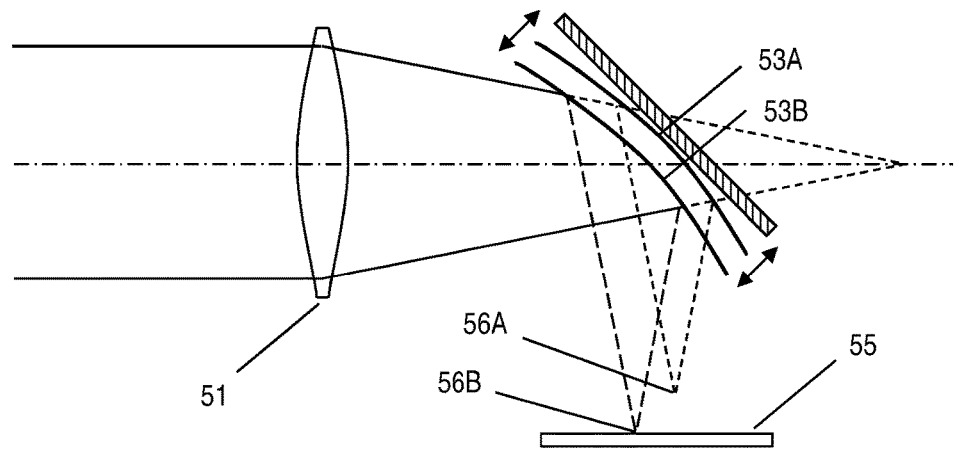
FIG. 5 is a schematic diagram showing auto focusing function by translation of curved mirror.

FIG. 5 shows a schematic diagram of auto focusing device by a curved mirror translation. As explained before, translation of a mirror can makes an automatic focusing function. For this purpose, a curved mirror 53 is applied to the system. The mirror makes a focus at the image sensor plane 55 at the position 53B and changes its focal position if the mirror is moved to the position 53A. Even though the focusing lens 51 does not change its position or the focal length, the system can have different focal plane 56A, 56B by moving the curved mirror 53A, 53B.

Figure 6:
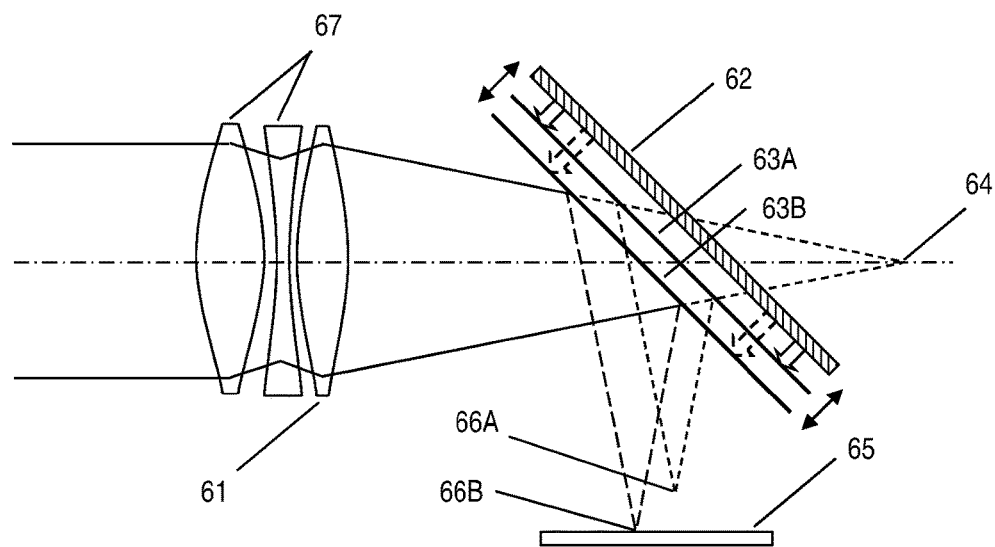
FIG. 6 is a schematic diagram showing auto focusing function by translation of flat mirror with auxiliary focusing optics.

FIG. 6 shows a schematic diagram of auto focusing device by mirror translation with auxiliary focusing optics. The system is similar with the one shown in FIG. 1. The only difference is that the system in FIG. 7 has auxiliary focusing optics 67. The auto focusing function still remains and the focusing power is enhanced. Apart from the focusing lens 61, the system has some auxiliary focusing optics 67. The group of the optics makes its focus on a point 64 and the translation device 62 attached mirror changes its focal image planes 66A, 66B with regards to the positions 63A, 63B of the mirror. The system can find its focus exactly on the image sensor plane 65.

As shown in FIGS. 1-6, the focus (or image) is shifted by translation of a flat mirror, translation of a plurality of small sized flat mirrors or translation of micromirror array lens. The image shift can be compensated by the signal processing of the image processor.

Figure 7:
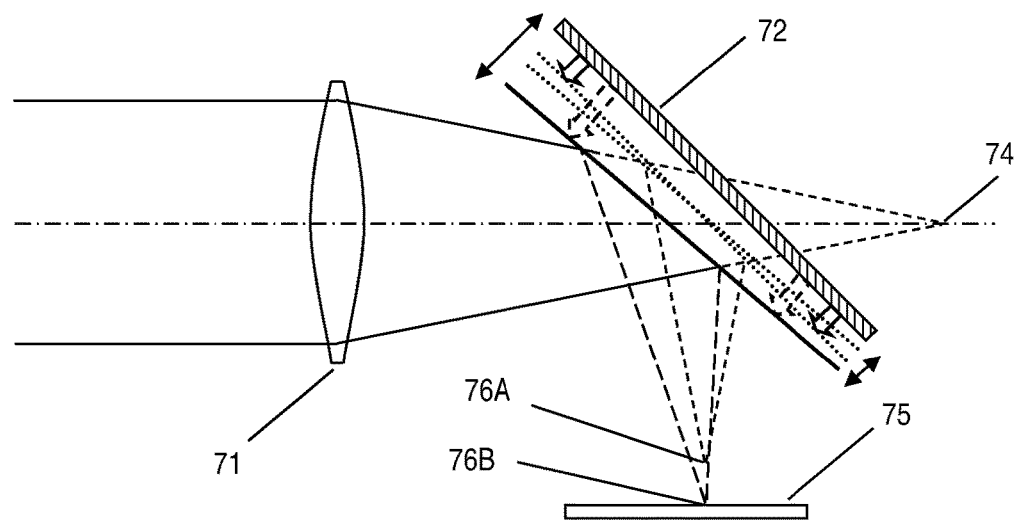
FIG. 7 shows a schematic diagram showing auto focusing function by tilt and translation of flat mirror for compensation of focus shift.

FIG. 7 shows a schematic diagram showing auto focusing function by tilt and translation of flat mirror for compensation of focus shift. In FIG. 1, the system can change its focal plane, but the image is shifted too. The focusing lens 71 makes its focus 74 if the translation mirror system 72 is not applied. The mirror has a translation to make its focus on the image sensor plane 75 and has a tilt to compensate a focus shift. Therefore, the focus is changed from 76A to 76B.

Figure 8:
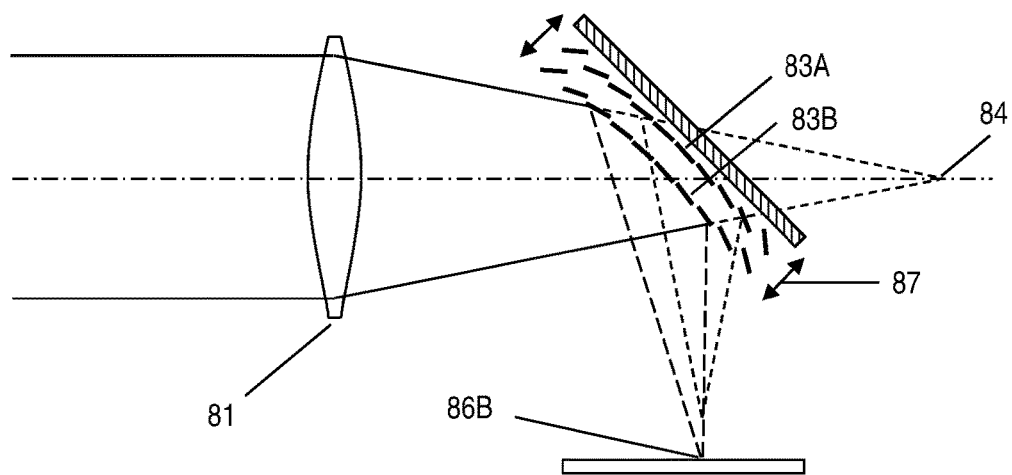
FIG. 8 is a schematic diagram showing auto focusing function with changing optical axis of micromirror array for compensation of focus shift.

FIG. 8 shows a schematic diagram showing auto focusing function by changing optical axis of micromirror array lens for compensation of focus shift. The optical axis change of micromirror array lens is described in the U.S. patent application Ser. No. 10/855,287 for "Variable Focal Length Lens comprising Micrimirrors with Two Degrees of Freedom Rotation and One Degree of Freedom Translation" filed on May 27, 2004. Since the micromirror array lens itself has an ability to change its optical axis, the auto focusing system with micromirror array lens 83A, 83B can change its focal length by macroscopic translation 87 of the micromirror array lens and/or variable focus of the micromirror array lens and compensate the focus shift by optical axis change of the micromirror array lens. The focusing lens 81 makes its focus on a point 84 and the micromirror array lens 83B makes its focus at the position 86B without focus shift on the image sensor by changing its optical axis.

Figure 9:
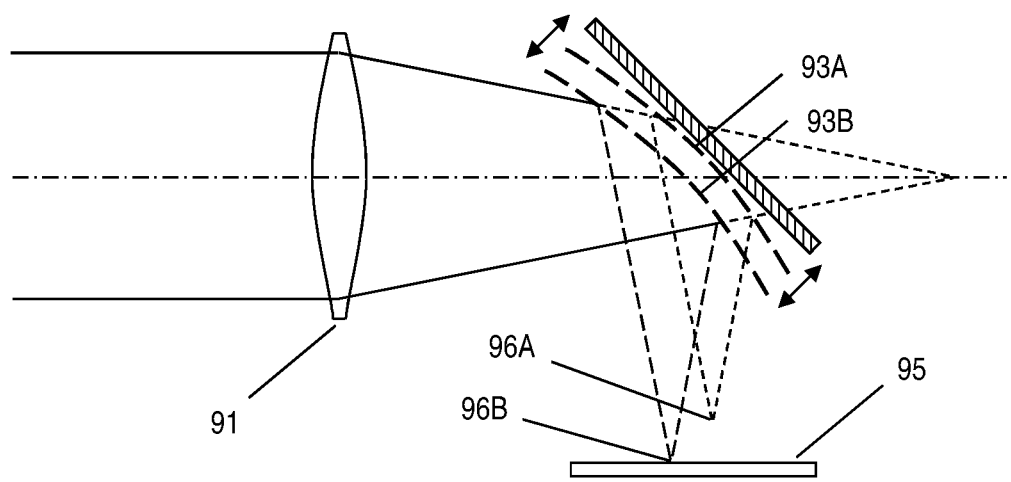
FIG. 9 is a schematic diagram showing auto focusing device by translation of a plurality of curved mirrors.

FIG. 9 shows a schematic diagram of auto focusing device by translation of a plurality of curved mirrors. As explained before, translation of a mirrors can makes an automatic focusing function. For this purpose, a plurality of curved mirrors 93A, 93B are applied to the system. The mirrors make a focus at the image sensor plane 95 at the position 93B and change its focal position if the mirrors are moved to the position 93A. Even though the focusing lens 91 does not change its position or the focal length, the system can have different focal plane 96A, 96B by moving the curved mirrors 93A, 93B.

The mirrors in FIGS. 1-9 obtain their translational motion by electrostatic, electromagnetic, and/or electrothermal forces 18A in FIG. 1. Piezo electric materials 18B in FIG. 1 are also used for making translational motion and used with electrostatic, electromagnetic, and/or electrothermal forces.

While the invention has been shown and described with reference to different embodiments thereof, it will be appreciated by those skills in the art that variations in form, detail, compositions and operation may be made without departing from the spirit and scope of the invention as defined by the accompanying claims.

What is claimed is:

1. An automatic focusing system using translation of a plurality of mirrors comprises of:
   (a) a focusing lens;
   (b) a plurality of mirrors, wherein the mirrors are made by microfabrication technologies to have a small mirror mass and a fast response time;
   (c) a micro electro-mechanical translation device comprising a plurality of variable supporters and made by microfabrication technologies, wherein translations of the mirrors are discretely controlled by the variable supporters;
   (d) an imaging sensor that receives light from an object; and
   (e) an image processor in communication with the image sensor and the micro electro-mechanical translation device; wherein the electro-mechanical translation device controls the translations of the mirrors to make an active auto focusing on the image sensor.

2. The automatic focusing system of claim 1, wherein the mirror is flat.

3. The automatic focusing system of claim 1, wherein the mirrors are flat.

4. The automatic focusing system of claim 1, wherein the mirror is a curved mirror.

5. The automatic focusing system of claim 1, wherein the plurality of the mirrors are curved mirrors.

6. The automatic focusing system of claim 1, wherein the plurality of the mirrors are a micromirror array lens.

7. The automatic focusing system of claim 1, wherein the micro electro-mechanical translation device makes its motion by electrostatic force.

8. The automatic focusing system of claim 1, wherein the micro electro-mechanical translation device makes its motion by electrothermal force.

9. The automatic focusing system of claim 1, wherein the micro electro-mechanical translation device uses piezo materials for making its motion.

10. The automatic focusing system of claim 1, wherein the discrete motion is achieved by electrostatic force controlled by digital and/or discrete operation of a voltage.

11. The automatic focusing system of claim 1, wherein the applied voltage to the micro electro-mechanical translation device is digital and/or discrete.

12. The automatic focusing system of claim 1, wherein the image sensor converts the photo energy of the light to an electrical signal carrying image data to the image processor.

13. The automatic focusing system of claim 1, wherein the image processor uses an algorithm to compare the image quality of the image data with its focus criteria and generates a feedback signal that moves the mirrors.

14. The automatic focusing system of claim 13, wherein the feedback signal activates the micro electro-mechanical translation device.

15. The automatic focusing system of claim 1, wherein the plurality of the mirror is tilted to compensate the shift of the image on the image sensor plane.

16. The automatic focusing system of claim 6, wherein the micromirror array lens changes its optical axis to compensate the shift of the image on the image sensor plane.

17. The automatic focusing system of claim 1, wherein the image processor compensates the shift of the image on the image sensor plane.

* * * * *